Patented Oct. 20, 1936

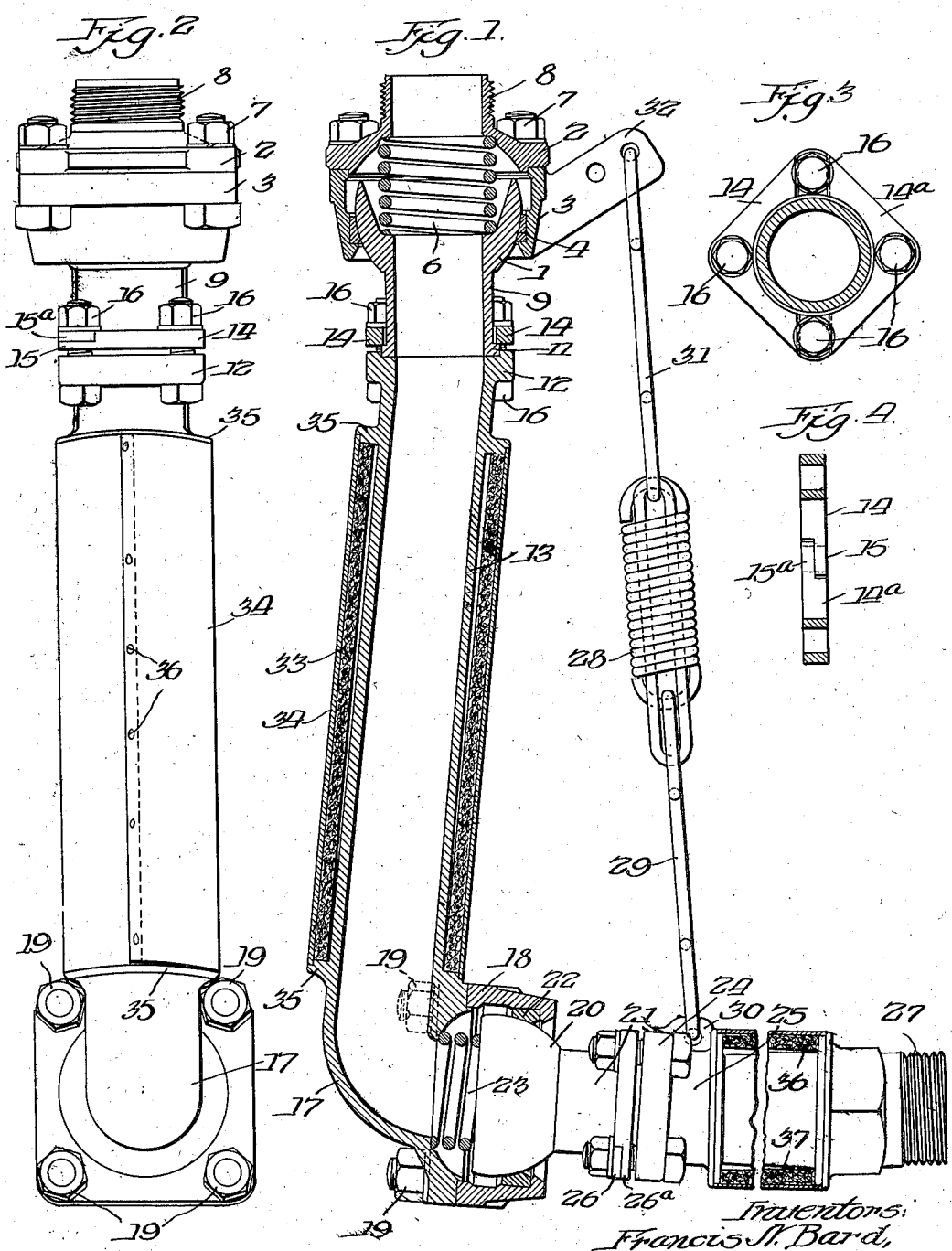

2,058,124

UNITED STATES PATENT OFFICE 2,058,124

CAR CONNECTION

Francis N. Bard, Highland Park, Thomas C. Gray, Evanston, and Alfred H. Priebe, Wilmette, Ill., assignors to Barco Manufacturing Co., Chicago, Ill., a corporation of Illinois Application February 27, 1932, Serial No. 595,478

2 Claims. (Cl. 285—7)

This invention relates to flexible tubular connections and more particularly to the type employed for establishing connection between the steam or air lines of the coupled cars of a railway train.

Connections for this purpose, in order to be practical, must be so constructed that they will adequately clear the ties when uncoupled, will afford sufficient flexibility to permit, without injury to or strain upon the connections, the relative movements between adjacent cars incident to transit, will afford unrestricted transmission of steam or air from one car to another and will be durable and free from leakage in operation.

In addition to successfully meeting all of the foregoing requirements, our invention is designed to be readily disassembled and reassembled for repair and replacement purposes within the limited space afforded between the cars. With this end in view, the joints of our connection are so located and constructed that the parts required to be manipulated in the dismantling and reassembling operations are all located in readily accessible positions. Furthermore the unscrewing of large pipes and collars, both of which after long use become set by rust or other causes so that their turning requires the exertion of extreme efforts, is obviated by our invention. The mere removal of relatively small bolts with the use of an ordinary wrench and without much effort is all that is required in dismantling our connection, the use of large pipe wrenches or other cumbersome tools difficult of manipulation in the restricted space afforded being entirely eliminated.

The ball members of the two ball joints employed in our connection and also the joint assembly by which each ball connection is connected with the adjoining pipe section are of duplicate construction which permit of interchangeability and a consequent reduction in the number of different stock parts required to be carried.

In our invention one section of the lower ball joint casing is formed integrally with the elongated vertical pipe section of the connection thereby eliminating all threaded joints in the vicinity of the elbow of the connection and consequently precluding the possibility of leakage in this region.

Our invention contemplates also and is designed to permit the use of molded heat insulation material around the pipe section of the connection and permits the employment of a metal casing or shell for the insulation which, because there are no joints within the insulation, may be permanently spot-welded in position.

Our invention provides therefore a connection which is strong, durable, and light in weight, one which provides adequate flexibility, affords a free passage of fluid therethrough and is adequately heat insulated, and one which in addition to meeting all of the requirements for a connection of this character embodies no joints inside the insulation and is capable of being readily disassembled and reassembled with no other tools than an ordinary small wrench.

Other advantages of our invention should be apparent from the following detailed description considered in connection with the accompanying drawing in which:

Fig. 1 is a longitudinal section through the center of a car connection embodying the principles of this invention, Fig. 2 is an end elevation of the connection shown in Fig. 1, Fig. 3 is an end elevation of the coupling rings or flanges used to secure the ball necks to the intermediate pipes, and Fig. 4 is a section through the center of a pair of connecting rings shown in Fig. 3.

Referring now to the drawing more in detail it will be observed that the connection comprises a vertical connecting or intermediate pipe having a ball joint disposed at each end thereof. The upper joint is connected to the end valve of a car and the other joint is connected to a second intermediate or horizontal pipe which carries the usual coupler head. The horizontal pipe and attached coupler head are yieldably supported in substantially horizontal position by a spring which insures against the coupler head or the connection contacting the road bed when the connections are uncoupled.

More specifically the connection comprises an upper ball 1 disposed within the two separable sections 2 and 3 of a separable ball casing. A gasket 4 is disposed between the outer spherical surface of the ball 1 and the lower section 3 of the casing, and a spring 6 maintains the ball in seating contact with the gasket. The two sections of the casing are flanged and secured together by bolts 7. This manner of securing the two sections together eliminates the use of large threaded connections of approximately the largest diameter of the casing which are difficult to manipulate and furthermore permits reduction of the over-all dimension of the casing.

The upper section 2 which is preferably a forging, is provided with an integral threaded nipple end 8 by means of which it may be permanently secured to the car end valve. The ball 1 is formed with an integral sleeve or neck 9 of substantially less diameter than the ball and which terminates in a flanged end 11 adapted to seat within a recess in the upper flanged end 12 of the vertical intermediate pipe 13. The neck 9 and the pipe 13 are held together by a detachable connection including a pair of split flange rings 14 and 14a having stepped, overlapped ends 15 and 15a and bolts 16 extending through the flange rings 14 and 14a and flange 12 by which the parts are drawn together. The application of the rings 14 and 14ᵃ is clearly shown in Figs. 3 and 4. In order to enable maximum angularity of the connection in service or, in other words, to permit maximum swinging movement of the ball neck relatively to its casing section 3, the neck or that portion of it opposed to the surrounding casing opening is made of smaller diameter than the remainder of the passage through which the fluid flows.

The impedance to the flow of fluid and the consequent pressure reduction ordinarily resulting from the imposition of a restriction in a flow line are overcome in our invention by tapering the passage outwardly beyond the restriction so that it permits a gradual expansion of the fluid stream and a recovery of pressure upon the Venturi principle without appreciable loss.

In the form of our invention illustrated on the drawing the gradual enlargement of the passage is continued throughout a substantial portion of the length of the pipe section 13, but obviously the length and angularity of the taper may be varied in accordance with the requirements of conditions.

The lower end of pipe 13 is shaped to form an angle casing or elbow 17 which is integral with the pipe and constitutes one section of the lower ball casing. The other section 18 is secured thereto by bolts 19 in the same manner in which sections 2 and 3 of the upper ball casing are secured together. A ball 20 within the casing is provided with an integral neck 21 similar to neck 9. The casing and ball are accurately located so as to give maximum amount of movement in the very limited space available without interrupting the flow of fluid. This joint is also provided with a gasket 22 and a spring 23 to urge the ball into contact with gasket 22. The ball neck 21 is detachably fastened to the flanged end 24 of a horizontal intermediate pipe 25 by a second pair of split overlapping rings 26 and 26ᵃ in a manner similar to that previously described. The other end of pipe 25 is threaded as at 27 for connection to the usual coupler head.

The lower pipe is normally retained in substantially horizontal position by a spring 28, one end of which is connected by a link 29 to an eye 30 formed on the horizontal pipe and the other end of which is connected by a link 31 to an arm 32 extending from casing 3.

The connection may be insulated by surrounding the upper pipe 13 with a body of insulation 33 preferably molded into proper form and encased in a metallic shell 34 preferably made in sections and spot-welded together as at 36. The insulation and casing are retained in position against longitudinal movement by spaced flanges 35 extending from the pipe 13. The lower or horizontal pipe may be similarly provided with insulation 36 encased in a metallic shell 37.

From the foregoing it will be apparent that in order to renew the gasket in the upper ball joint for instance, it is only necessary to remove the accessible and easily removable bolts 7 to break the ball casing, remove bolts 16 to separate neck 9 from the upper end of pipe 13 and remove split flanges 14 and 14ᵃ. Section 3 and gasket 4 may then be slipped off from the neck 9, a new gasket substituted and the casing and neck reassembled.

The renewal operation involves no disturbance of the lower ball or the lower end of pipe 13 which consequently may be cast integrally with the lower ball casing thereby obviating any joint in that region. The gasket 22 of the lower ball joint may be similarly removed and replaced by merely opening the lower ball casing and disconnecting neck 21 from pipe 25.

It will be apparent that our improved connection involves a unique combination of forgings where strength is required and castings where simplicity and freedom from extra parts is paramount. The ball members and integral necks are preferably hardened steel forged capable of resisting shocks without injury and are made rust proof so as to maintain perfect seating surfaces. The construction eliminates all concealed joints as well as the large connection nuts which are always difficult to manipulate and particularly when inaccessibly located as they are in joints for this purpose. The small accessibly located bolts of our connection are easy to remove and replace even within the limited available space. Our joint may be disassembled and reassembled without disturbance of the insulation which may therefore be permanently applied. Threaded connections between the pipe sections are eliminated and the whole structure may be economically produced and assembled and readily disassembled for repair or replacement purposes.

Many changes may be made in the details of construction illustrated without departing from the spirit and scope of this invention as defined in the appended claims.

We claim:

1. A train pipe connector comprising a pendent rigid connecting pipe including an elbowed lower section and a detachable upper section provided with a ball member forming one element of a ball joint, bolt-fastened means by which said sections are detachably connected together, the longitudinal axes of said sections being disposed at an angle to each other, and a substantially horizontally disposed connecting pipe connected by a flexible joint to said elbowed section, the angularity of the sections of said pendent pipe permitting said flexible joint to be disposed substantially under the said ball joint when the connector in service hangs in mid position.

2. A train line connection including a sectional ball joint casing one section thereof being constructed for attachment to a train line and the other section thereof being detachably bolted to said first section and provided with an internal ball seat and a ball neck opening, a ball seated in said casing having a neck projecting through said opening and provided with an end flange proportioned to pass through said opening, a pipe section provided with a circumferential end flange adapted to engage said neck end flange, and detachable means including bolts and a split ring flange cooperating with the aforesaid flanges to removably connect said neck and pipe section together, whereby removal of the detachable section of the ball casing is facilitated.

FRANCIS N. BARD.
THOMAS C. GRAY.
ALFRED H. PRIEBE.